(12) United States Patent
Oh et al.

(10) Patent No.: US 9,602,877 B2
(45) Date of Patent: Mar. 21, 2017

(54) METHOD AND APPARATUS FOR PROCESSING DIGITAL SERVICE SIGNAL

(71) Applicant: LG Electronics Inc., Seoul (KR)

(72) Inventors: Sejin Oh, Seoul (KR); Jinpil Kim, Seoul (KR); Jongsung Choi, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/442,025

(22) PCT Filed: Nov. 8, 2013

(86) PCT No.: PCT/KR2013/010146
§ 371 (c)(1),
(2) Date: May 11, 2015

(87) PCT Pub. No.: WO2014/073912
PCT Pub. Date: May 15, 2014

(65) Prior Publication Data
US 2015/0296262 A1 Oct. 15, 2015

Related U.S. Application Data

(60) Provisional application No. 61/725,017, filed on Nov. 11, 2012.

(51) Int. Cl.
*G06F 13/00* (2006.01)
*G06F 3/00* (2006.01)
(Continued)

(52) U.S. Cl.
CPC ..... *H04N 21/4725* (2013.01); *H04N 21/4221* (2013.01); *H04N 21/4622* (2013.01);
(Continued)

(58) Field of Classification Search
USPC ............................................. 725/38, 40, 43
See application file for complete search history.

(56) References Cited

U.S. PATENT DOCUMENTS

| 6,806,889 | B1 | 10/2004 | Malaure et al. |
| 2011/0209181 | A1* | 8/2011 | Gupta ............... H04N 7/163 725/62 |

(Continued)

FOREIGN PATENT DOCUMENTS

| KR | 10-2005-0014945 A | 2/2005 |
| KR | 10-2009-0043880 A | 5/2009 |

(Continued)

OTHER PUBLICATIONS

Baba, et al.: "Seamless, Synchronous, and Supportive: Welcome to Hybridcast: An advanced hybrid broadcast and broadband system.", XP011440218, IEEE Consumer Electronics Magazine, vol. 1, No. 2, Mar. 31, 2012, pp. 43-52.

(Continued)

Primary Examiner — Hunter B Lonsberry
(74) Attorney, Agent, or Firm — Dentons US LLP

(57) ABSTRACT

The digital service signal processing apparatus according to one embodiment of the present invention, comprises: a generation module for generating a request for receiving signaling information of an application related to a program of a digital service signal using the channel information related to the program of the digital service signal; a control module for transmitting the generated request, receiving the signaling information of the application, and determining whether the application is stored using the received signaling information of the application; and a download module for downloading, if it is determined that the application is not stored, the application using the signaling information of the application.

14 Claims, 12 Drawing Sheets

(51) Int. Cl.
    *H04N 5/445*     (2011.01)
    *H04N 21/4725*     (2011.01)
    *H04N 21/81*     (2011.01)
    *H04N 21/858*     (2011.01)
    *H04N 21/422*     (2011.01)
    *H04N 21/462*     (2011.01)
    *H04N 21/643*     (2011.01)

(52) U.S. Cl.
    CPC ... *H04N 21/64322* (2013.01); *H04N 21/8133* (2013.01); *H04N 21/8173* (2013.01); *H04N 21/8586* (2013.01)

(56) References Cited

U.S. PATENT DOCUMENTS

2012/0047528 A1*   2/2012   Seo .................... H04N 21/4316
                                              725/32
2012/0050619 A1     3/2012   Kitazato et al.

FOREIGN PATENT DOCUMENTS

KR     10-2011-0049475 A     5/2011
WO           00/22816 A1     4/2000

OTHER PUBLICATIONS

English version of Search Report of European Patent Office in Appl'n No. 13854062.0, dated Jun. 21, 2016.

* cited by examiner

FIG. 3

| Channel number | Start time | End time | Title | Application URL |
|---|---|---|---|---|
| 9 - 1 | 2012-11-08-12:30 | 2012-11-08-13:30 | Drama | kbs.ohtv.org/drama | ... |
| 9 - 1 | 2012-11-08-13:30 | 2012-11-08-14:00 | News & weather | kbs.ohtv.org/news | ... |
| 9 - 1 | 2012-11-08-14:00 | 2012-11-08-15:00 | World Cup Finals | kbs.ohtv.org/sport | ... |
| ... | ... | ... | ... | ... | ... |

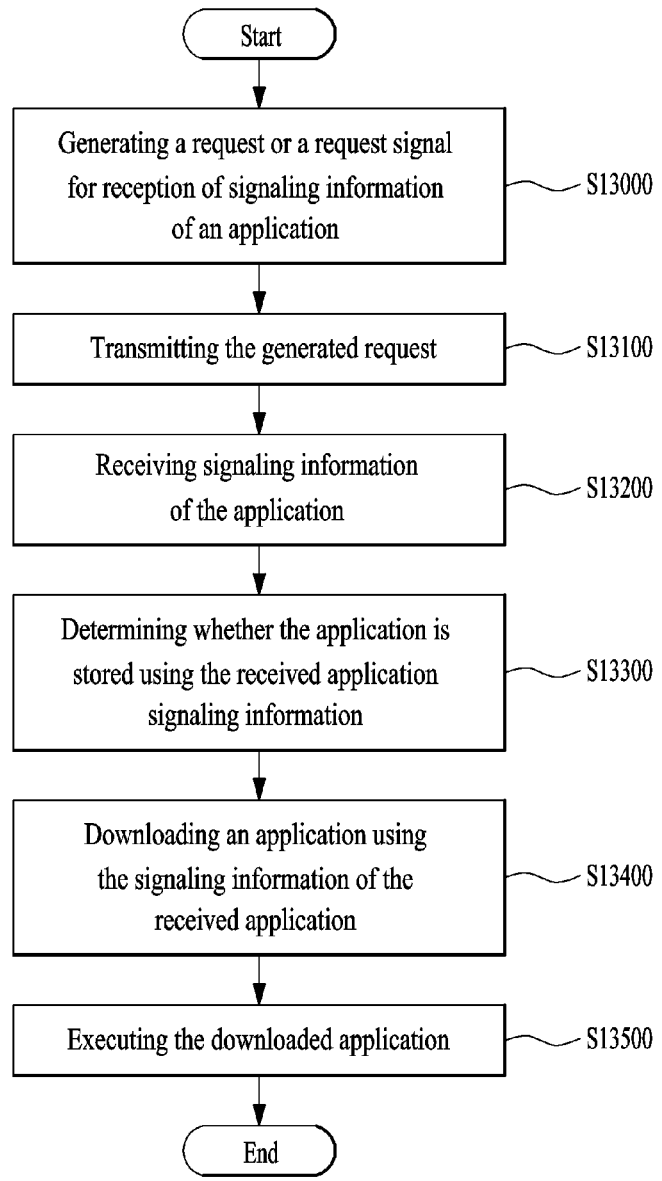

METHOD AND APPARATUS FOR PROCESSING DIGITAL SERVICE SIGNAL

This application is a National Phase application of International Application No. PCT/KR2012/010146, filed Nov. 8, 2013, and claims the benefit of U.S. Application No. 61/725,017, filed on Nov. 11, 2012, all of which are hereby incorporated by reference in their entirety for all purposes as if fully set forth herein.

TECHNICAL FIELD

The present invention relates to a method and apparatus for processing a digital service signal, and more particularly, to a method and apparatus for processing a digital service signal to control an application related to a current broadcast program in a hybrid digital television (TV) system in which terrestrial broadcast data is transmitted/received using a broadcast network and an Internet protocol network.

BACKGROUND ART

A hybrid digital television (TV) system is a TV system capable of providing a viewer with an enhanced TV viewing experience by transmitting/receiving enhancement data through an Internet protocol (IP) network based on metadata related to a terrestrial broadcast program.

In the hybrid digital TV system, a transmitter may transmit broadcast data and signaling information of the broadcast data in real time through a broadcast network, and a receiver may receive the broadcast data and the signaling information of the broadcast data in real time through the broadcast network. In addition, the receiver of the hybrid digital TV system may receive enhancement data related to broadcast data through the IP network using the received signaling information.

Therefore, in order to acquire an application, etc. related to the broadcast data, the receiver of the hybrid digital TV system needs to receive signaling information necessary to acquire the application.

DISCLOSURE

Technical Problem

As described in the foregoing, the hybrid digital TV system may transmit/receive the signaling information necessary to acquire the application through the broadcast network. When the signaling information necessary to acquire the application is not transmitted/received through the broadcast network, the receiver of the hybrid TV system may acquire signaling information necessary to acquire an associated application from a domain name server (DNS), and receive the application using the acquired signaling information.

DNS is a collective term for a system that changes a domain name created as characters so as to be easily remembered by people on a transfer control protocol (TCP)/IP network which corresponds to an Internet protocol to an Internet protocol address processable by a computer, and a server thereof. Even though the domain name corresponds to an Internet address, an Internet address in a number system is needed to actually identify a computer on the Internet.

All host servers operated by each site have unique IPs, and thus the domain name is changed to an IP address recognizable by a host server through the DNS server. Therefore, the DNS server stores domain information and IP information of each site in a database, and then translates a signal for access to a corresponding site when the signal is received, and sends the signal to a host server of a site having a corresponding IP.

In the hybrid digital system, the DNS server may store and manage signaling information for acquisition of an application related to a broadcast program in a database for each channel of a current broadcast program, and transmit the signaling information for acquisition of the application to the receiver of the hybrid TV system in response to a request signal of the receiver of the hybrid TV system.

However, in this case, there may be a problem in that a life cycle of the application may not be controlled due to a change of current broadcast data.

Technical Solution

In this regard, the present invention provides a method and apparatus for processing a digital service signal capable of controlling a life cycle of an application. A method of processing a digital service signal according to an embodiment of the present invention includes creating a request for reception of signaling information of an application related to a program of the digital service signal using channel information related to the program of the digital service signal, the channel information being transmitted through a service signaling table, transmitting the created request, receiving the signaling information of the application, determining whether the application is stored using the received signaling information of the application, downloading the application using the signaling information of the application when the application is not stored as a result of determination, and executing the downloaded application.

Advantageous Effects

According to a method and apparatus for processing a digital service signal according to an embodiment of the present invention, it is possible to efficiently operate a database related to application signaling information.

In addition, according to a method and apparatus for processing a digital service signal according to an embodiment of the present invention, it is possible to control a life cycle of an application related to a broadcast program according to a change of the broadcast program, etc.

DESCRIPTION OF DRAWINGS

FIG. 3 is a table showing an instance of an application database in a DNS server according to an embodiment of the present invention.

FIG. 13 is a flowchart illustrating a method of processing a digital service signal according to an embodiment of the present invention.

BEST MODE

Figure 1:
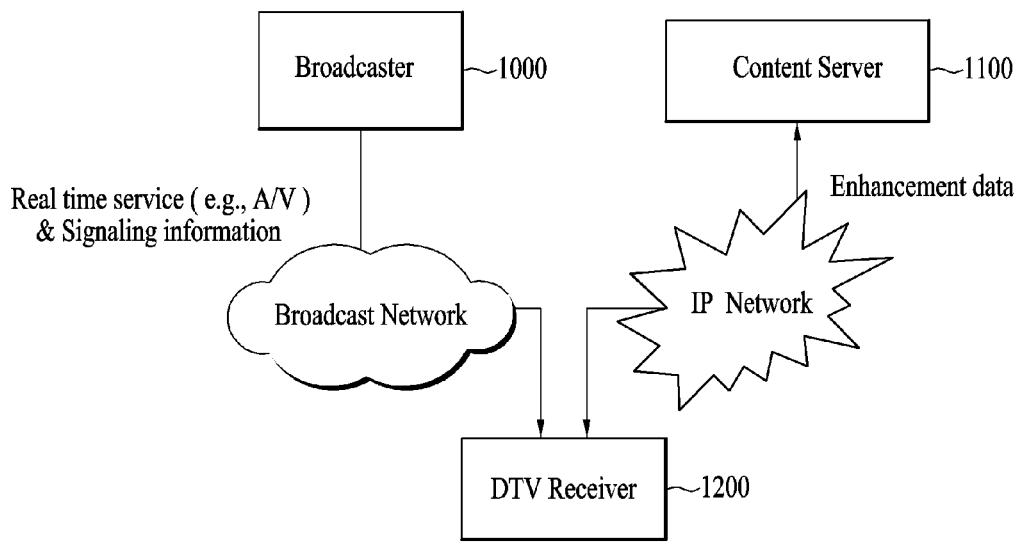
FIG. 1 is a block diagram illustrating an example of a hybrid TV system.

The above object will be described below with reference to the accompanying drawings a preferred embodiment of the invention, which can specifically be realized. The configuration is shown in the drawings and will also be explained by the action of the present invention it is described as at least one embodiment, this is the spirit and globally by the present invention is not limited.

As used in the present invention was selected as a general term that is used now widely considered as functions of the present invention, which may vary depending on the appearance of the form of the accompanying or new technologies to engage in the art. Further, when a particular term may also optionally choice of the applicant, this case will be described in detail in the description of the meaning of the invention is. Therefore, the terms used in the present invention, they come out and must be defined based on the contents throughout the meaning of the terminology of the present invention and instead of a simple name of the terminology.

FIG. 1 is a block diagram illustrating an example of a hybrid television (TV) system.

The hybrid TV system illustrated in FIG. 1 is a hybrid TV system in which broadcast data and enhancement data are transmitted/received using a terrestrial broadcasting network and an Internet protocol network. As illustrated in FIG. 1, the hybrid TV system may include a broadcaster 1000, a content server 1100, and a digital television (DTV) receiver 1200. According to an embodiment of the present invention, the content server 1100 may be referred to as an application server according to intent of a designer. Hereinafter, the hybrid TV system will be described by focusing on operations of respective blocks.

The broadcaster 1000 refers to a broadcasting station that transmits a broadcast program. The broadcaster 1000 may transmit audio/video (A/V) data and signaling information of a real-time broadcasting service to the DTV receiver 1200 through a broadcast network. The signaling information may include a service signaling table which includes channel information related to the A/V data of the real-time broadcasting service, signaling information for acquisition of an application, etc. According to an embodiment of the present invention, the service signaling table may include a virtual channel table (VCT), an event information table (EIT), etc. In addition, in the present invention, the signaling information for acquisition of the application is referred to as application signaling information, which may be changed by a designer.

The DTV receiver 1200 may request that the content server 1100 transmit the application through the Internet protocol network using the application signaling information which is received through the broadcast network.

In addition, the content server 1100 may transmit, to the DTV receiver 1200, enhancement data of a current broadcasting service such as the application through the Internet protocol network.

Figure 2:
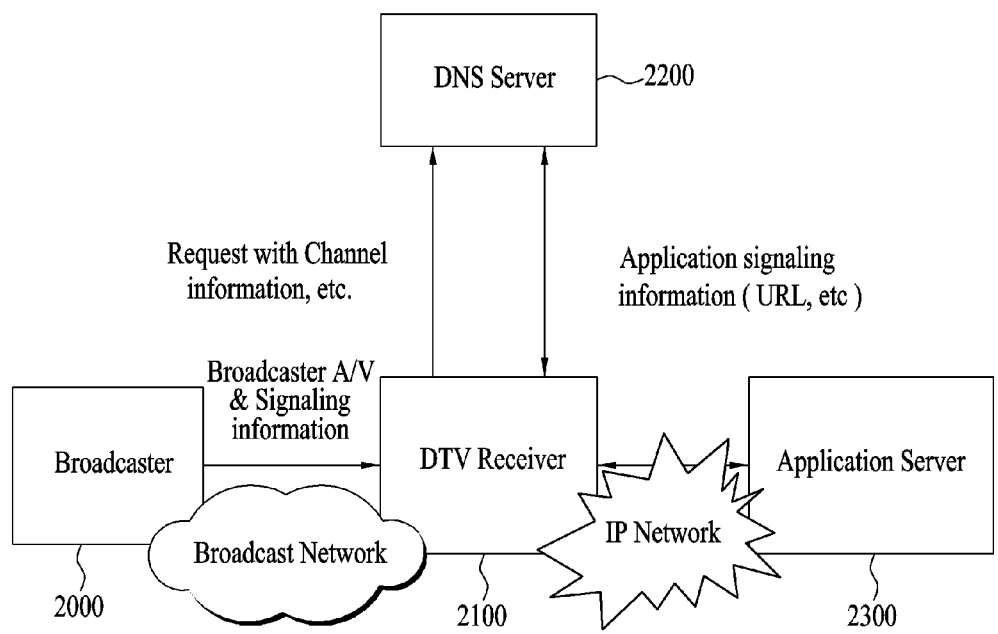
FIG. 2 is a block diagram illustrating another example of a hybrid TV system.

FIG. 2 is a block diagram illustrating another example of a hybrid TV system.

The hybrid TV system illustrated in FIG. 2 is similar to the hybrid TV system described with reference to FIG. 1. However, FIG. 2 illustrates a case in which signaling information for acquisition of an application is not transmitted/received through a broadcast network.

The hybrid TV system illustrated in FIG. 2 is identical to the hybrid TV system illustrated in FIG. 1 except that a domain name server (DNS) 2200 is included. Hereinafter, the hybrid TV system will be described by focusing on operations of respective blocks.

A broadcaster 2000 may transmit A/V data and signaling information of a real-time broadcasting service to a DTV receiver 2100 through a broadcast network. In this case, the signaling information may include a service signaling table which includes channel information related to the A/V data of the real-time broadcasting service, etc., and does not include application signaling information.

Therefore, the DTV receiver 2100 may not receive the application signaling information through the broadcast network. In this case, the DTV receiver 2100 may generate a request or a request signal using the signaling information received through the broadcast network, for example, channel information, etc., and transmit the request signal to a DNS server 2200 to request the application signaling information. The application signaling information may include uniform resource locator (URL) information, etc. of the application.

As described in the foregoing, the DNS server 2200 may store and manage application signaling information related to a broadcast program in a database for each channel of a current broadcast program. In addition, the DNS server 2200 may transmit the application signaling information to the DTV receiver 2100 according to the request signal. Details of the application signaling information stored and managed in the database of the DNS server 2200 will be described below.

Thereafter, the DTV receiver 2100 may request that a content server 2300 transmit an application through an Internet protocol network using the application signaling information received from the DNS server 2200. In addition, the content server 2300 may transmit, to the DTV receiver 2100, enhancement data of a current broadcasting service such as the application through the Internet protocol network.

However, in the hybrid TV systems described with reference to FIGS. 1 and 2, it is possible to receive application signaling information through the broadcast network or the Internet protocol network, and acquire an application using the received application signaling information. However, a life cycle of the application may not be controlled.

For example, it is presumed that a user who is viewing a particular program on one channel terminates an application related to the particular program using a remote controller, etc.

The application related to the particular program is mostly provided as hypertext markup language (HTML), etc. which operates on a web browser. Thus, when the user terminates the application, the web browser may also be terminated. However, when a broadcast program is changed on the same channel, an application related to the changed broadcast program may not be provided to the user if a DTV receiver cannot acquire application information related to the changed broadcast program.

Therefore, the present invention proposes a method and apparatus for controlling a life cycle of the application related to the changed broadcast program when the broadcast program is changed in the hybrid TV system.

Specifically, the present invention proposes operations for executing the application according to a case in which the DTV receiver receives the changed information of the broadcast program from a DNS server and a case in which the DTV receiver receives the changed information of the broadcast program from a broadcaster in order to control the life cycle of the application related to the broadcast program.

Hereinafter, a description will be mainly given of the operation according to the case in which the DTV receiver receives the changed information of the broadcast program from the DNS server.

FIG. 3 is a table showing an instance of an application database in a DNS server according to an embodiment of the present invention.

As described in the foregoing, a DNS server and a DTV receiver of a hybrid TV system according to an embodiment of the present invention may control a life cycle of an application using changed information of a broadcast program. Specifically, the DNS server according to the present embodiment may manage application signaling information related to a current channel and the broadcast program, and transmit related information to the DTV receiver when there is a change. In addition, the DTV receiver according to the present embodiment may acquire changed information of the channel or the broadcast program from the DNS server, and receive related application signaling information to acquire and execute an application related to the changed broadcast program.

FIG. 3 illustrates the application signaling information included in an application database in the DNS server for executing the above-described content.

As illustrated in FIG. 3, the DNS server according to the present embodiment may include the application database that maintains and manages the application signaling information related to the broadcast program for each broadcast channel based on a time of the broadcast program, etc.

The application database in the DNS server illustrated in FIG. 3 may include application signaling information which includes information about a channel number, a start time, an end time and a title of the broadcast program, information about a URL of the related application, etc. Content of the application signaling information may be changed by a designer.

Therefore, the DTV receiver according to the present embodiment may periodically request the application signaling information based on broadcast channel information, current time information, etc. The DNS server according to the present embodiment may extract the application signaling information including the information about the broadcast program, the application URL information, etc. from the application database illustrated in FIG. 3 in response to a request from the DTV receiver, and transmit the application signaling information to the DTV receiver. In addition, the DNS server according to the present embodiment may transmit, to the DTV receiver, application signaling information changed according to a point in time at which the broadcast program is changed or a point in time at which the application signaling information is changed. The changed application signaling information may include information about the changed broadcast program. Therefore, the DTV receiver according to the present embodiment may verify whether the broadcast program is changed using the application signaling information acquired from the DNS server, and control a life cycle of an application by terminating execution of a currently executed application or executing a new application in response to a change of the broadcast program.

Figure 4:
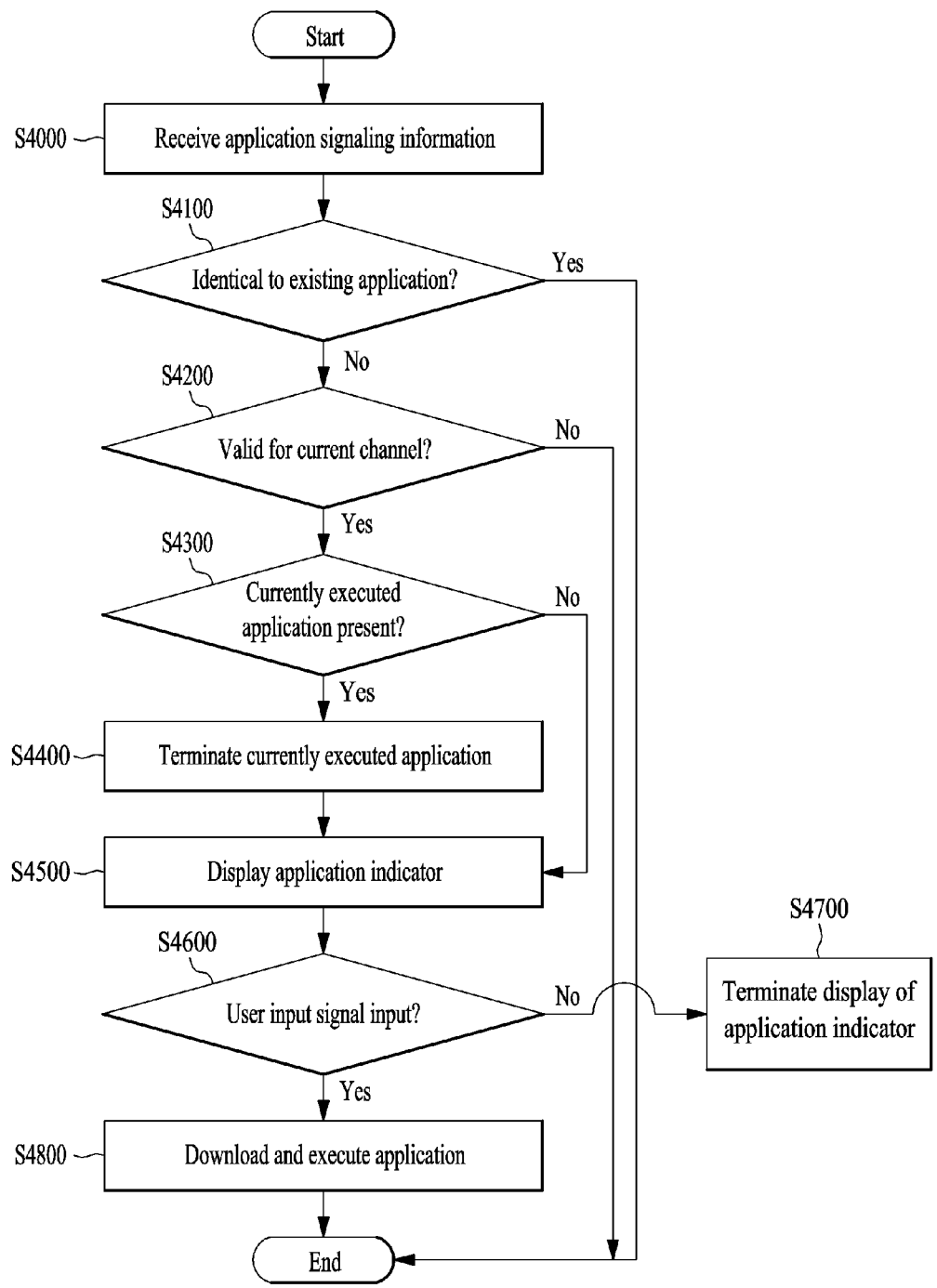
FIG. 4 is a flowchart illustrating an operation of a digital television (DTV) receiver according to an embodiment of the present invention.

FIG. 4 is a flowchart illustrating an operation of a DTV receiver according to an embodiment of the present invention.

Specifically, FIG. 4 is a flowchart illustrating an operation for execution of an application using received application signaling information after the DTV receiver according to the present embodiment receives the application signaling information from a DNS server.

As described in the foregoing, in S4000, the DTV receiver according to the present embodiment may receive application signaling information. As described with reference to FIG. 3, the DNS server according to the present embodiment may include an application database that maintains and manages application signaling information related to a broadcast program for each broadcast channel based on a time, etc. In addition, the DTV receiver may periodically request that the DNS server transmit the application signaling information based on broadcast channel information, current time information, etc., and receive the application signaling information from the DNS server. In addition, the DTV receiver according to the present embodiment may download a corresponding application using the received application signaling information.

Thereafter, in S4100, the DTV receiver according to the present embodiment may determine whether the application related to the received application signaling information is identical to an application which is previously stored or currently executed using the received application signaling information. Therefore, the DTV receiver according to the present embodiment may verify whether the application related to the received application signaling information is previously stored.

When the application related to the received application signaling information is identical to the application which is previously stored or currently executed as a result of determination, the DTV receiver according to the present embodiment may terminate the operation for execution of the application using the received application signaling information. In this case, the DTV receiver according to the present embodiment may or may not execute the stored application, and may maintain an execution state of the application which is currently executed.

When the application related to the received application signaling information is not identical to the application which is previously stored as a result of determination, the DTV receiver according to the present embodiment may determine whether the application related to the received application signaling information is valid for a current channel using the received application signaling information in S4200. In other words, it is possible to determine whether the application related to the received application signaling information is an application related to a broadcast program of the current channel.

When the application related to the received application signaling information is invalid for the current channel as a result of determination, the DTV receiver according to the present embodiment may terminate the operation for execution of the application using the received application signaling information. In this case, the DTV receiver according to the present embodiment may or may not execute the stored application, and may maintain the execution state of the application which is currently executed.

When the application related to the received application signaling information is valid for the current channel as a result of determination, the DTV receiver according to the present embodiment may determine whether a currently executed application is present in S4300.

When the currently executed application is present as a result of determination, the DTV receiver according to the present embodiment may suspend execution of the corresponding application in S4400.

When the currently executed application is absent as a result of determination, the DTV receiver according to the present embodiment may display an application indicator for execution of the application on a display unit in S4500.

In addition, the DTV receiver according to the present embodiment may display the application indicator even when execution of the currently executed application is suspended in S4500.

Thereafter, in S4600, the DTV receiver according to the present embodiment may determine whether a user input signal for execution of the application indicator is input by the user. The application indicator according to the present embodiment is used to inform the user that the related application is ready to be executed and may be entered through a red button of a remote controller. The application indicator according to the present embodiment may be displayed together with content of a currently displayed broadcast program. In addition, a shape of the application indicator and a position, an area, etc. of the displayed application indicator may be changed by a designer. Further, the user input signal according to the present embodiment may be input to the DTV receiver using the red button of the remote controller by the user.

When the user input signal is not input as a result of determination, the DTV receiver according to the present embodiment may terminate display of the application indicator in S4700.

When the user input signal is input as a result of determination, the DTV receiver according to the present embodiment may download an application from an application server, and execute the downloaded application in S4800. The application may be downloaded immediately after receiving the application signaling information as described above, and may be downloaded after the user input signal is input. The application may be downloaded according to intent of a designer.

Thereafter, the DTV receiver may terminate the operation for execution of the application in S4900.

Figure 5:
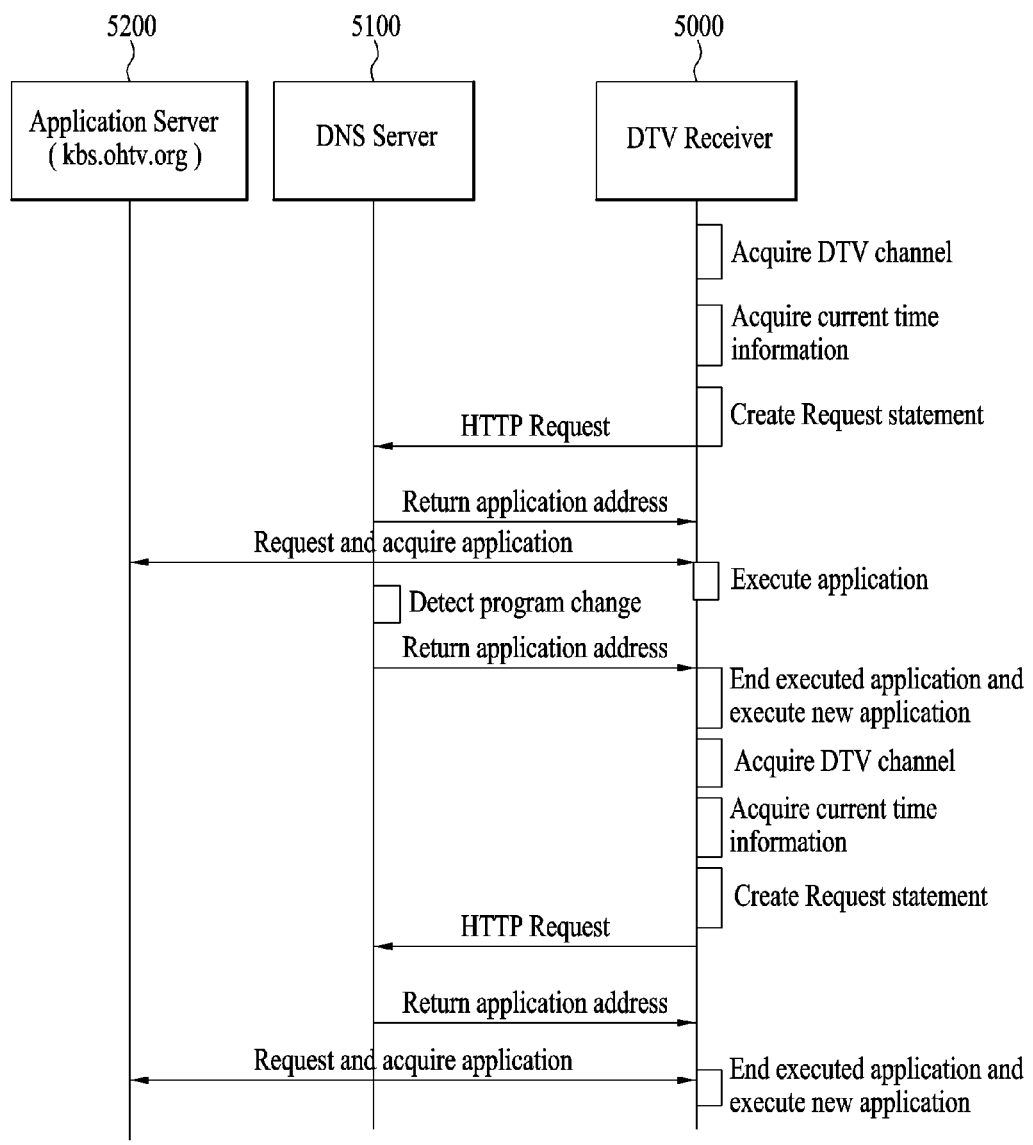
FIG. 5 is a diagram illustrating an operation of a hybrid TV system according to an embodiment of the present invention.

FIG. 5 is a diagram illustrating an operation of a hybrid TV system according to an embodiment of the present invention.

Specifically, FIG. 5 is a diagram illustrating an operation of a hybrid TV system according to an embodiment of the present invention focusing on operations of a DTV receiver 5000, a DNS server 5100, and an application server 5200 included in the hybrid TV system described with reference to FIGS. 1 and 2.

Hereinafter, the operation of the hybrid TV system will be described by focusing on respective constituent blocks.

As illustrated in FIG. 5, the DTV receiver 5000 may acquire channel information, time information of a current broadcast program, etc. from signaling information which is received from a broadcaster. The signaling information received from the broadcaster may include a service signaling table, etc. such as a VCT and an EIT. In addition, the DTV receiver 5000 may acquire the channel information, the time information of the current broadcast program, etc. from the service signaling table.

Thereafter, the DTV receiver 5000 may create a hypertext transfer protocol (HTTP) request using the channel information, the time information of the current broadcast program, etc. The HTTP request may be created as a combination of a parent domain name, specific media, a major channel number, a minor channel number, etc. such as "http://www.ohtv.org?ch=9-1&time=2012-11-10-13:10& . . . ". This may be changed by a designer.

Thereafter, the DTV receiver 5000 may transmit a request signal for delivery of the HTTP request to the DNS server 5100. As described in the foregoing, the DTV receiver 5000 may transmit application signaling information according to the request signal received from the DTV receiver 5000. As illustrated in FIG. 5, the application signaling information may include application URL information, etc.

Thereafter, the DTV receiver 5000 may request an application from the application server 5200 using the application URL information, etc. included in the received application signaling information. Then, the application server 5200 may transmit the application to the DTV receiver 5000. The DTV receiver 5000 may execute the received application.

As described with reference to FIG. 3, the DNS server 5100 may manage and maintain the application signaling information. In addition, the DNS server 5100 may transmit, to the DTV receiver, application signaling information changed according to a point in time at which the broadcast program is changed or a point in time at which the application signaling information is changed. The changed application signaling information may include information about the changed broadcast program or application URL information according to the changed broadcast program information.

Therefore, the DTV receiver 5000 may terminate execution of the executed application using the changed application signaling information which is received from the DNS server 5100, and execute a new application.

As illustrated in FIG. 5, when the executed application is terminated together with the program, the DTV receiver 5000 may acquire channel information, current time information, etc. again from the signaling information which is received from the broadcaster, create a request using the acquired channel information, current time information, etc., transmit the created request to the DNS server 5100, receive application signaling information, request an application from the application server 5200 using the received signaling information, receive the requested application, and then execute the received application.

In other words, as illustrated in FIG. 5, the DTV receiver 5000 may repeatedly perform the same operations depending on whether the application is terminated or the application signaling information is changed.

Figure 6:
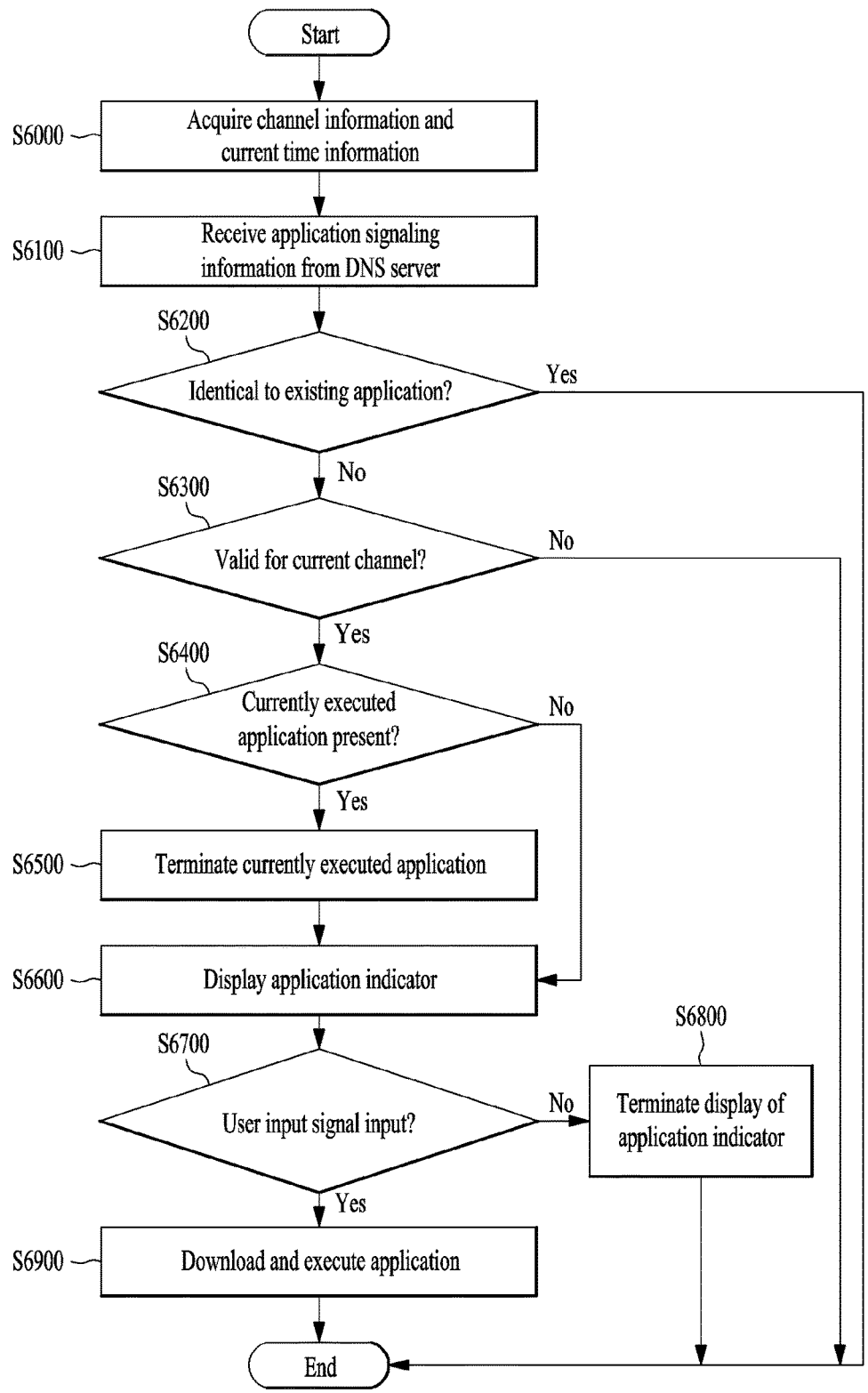
FIG. 6 is a flowchart illustrating another operation of the DTV receiver according to another embodiment of the present invention.

FIG. 6 is a flowchart illustrating another operation of the DTV receiver according to another embodiment of the present invention.

As described in the foregoing, the DTV receiver according to the present embodiment may periodically request that a DNS server transmit application signaling information related to a broadcast program and a current channel. FIG. 6 is a diagram illustrating an operation of the DTV receiver according to the present embodiment repeatedly performed at respective intervals. The operation of the DTV receiver illustrated in FIG. 6 is similar to the operation of the DTV receiver described with reference to FIG. 4, and thus the same operation will be briefly described.

As described with reference to FIG. 5, the DTV receiver may acquire channel information, current time information, etc. from signaling information which is received from a broadcaster in S6000. The signaling information received from the broadcaster may include a service signaling table, etc. such as a VCT.

Thereafter, the DTV receiver according to the present embodiment may receive application signaling information from a DNS server in S6100. As described in the foregoing, the DTV receiver may create a request using the signaling information which is received from the broadcaster, and transmit a request signal to the DNS server. The DNS server may transmit the application signaling information to the DTV receiver according to the request signal.

Thereafter, in S6200, the DTV receiver according to the present embodiment may determine whether an application related to the received application signaling information is identical to an application which is previously stored or currently executed using the received application signaling information. Therefore, the DTV receiver according to the present embodiment may verify whether the application related to the received application signaling information is previously stored.

When the application related to the received application signaling information is identical to the application which is previously stored or currently executed as a result of determination, the DTV receiver according to the present embodiment may terminate the operation for execution of the application using the received application signaling information. In this case, the DTV receiver according to the present embodiment may or may not execute the stored application, and may maintain an execution state of the application which is currently executed.

When the application related to the received application signaling information is not identical to the application which is previously stored as a result of determination, the DTV receiver according to the present embodiment may determine whether the application related to the received application signaling information is valid for a current channel using the received application signaling information in S6300. In other words, it is possible to determine whether the application related to the received application signaling information is an application related to a broadcast program of the current channel.

When the application related to the received application signaling information is invalid for the current channel as a result of determination, the DTV receiver according to the present embodiment may terminate the operation for execution of the application using the received application signaling information. In this case, the DTV receiver according to the present embodiment may or may not execute the stored application, and may maintain the execution state of the application which is currently executed.

When the application related to the received application signaling information is valid for the current channel as a result of determination, the DTV receiver according to the present embodiment may determine whether a currently executed application is present in S6400.

When the currently executed application is present as a result of determination, the DTV receiver according to the present embodiment may suspend execution of the corresponding application in S6500.

When the currently executed application is absent as a result of determination, the DTV receiver according to the present embodiment may display an application indicator for execution of the application on a display unit in S6600.

The DTV receiver according to the present embodiment may display the application indicator even when execution of the currently executed application is suspended in S6600.

Thereafter, in S6700, the DTV receiver according to the present embodiment may determine whether a user input signal for execution of the above-described application indicator is input by the user.

When the user input signal is not input as a result of determination, the DTV receiver according to the present embodiment may terminate display of the application indicator in S6800.

When the user input signal is input as a result of determination, the DTV receiver according to the present embodiment may download an application from an application server, and execute the downloaded application in S6900. The application may be downloaded immediately after receiving the application signaling information as described above, and may be downloaded after the user input signal is input. The application may be downloaded according to intent of a designer.

Thereafter, the DTV receiver may terminate the operation for execution of the application.

Hereinafter, a description will be mainly given of an operation in which a DTV receiver acquires information about a changed broadcast program from program and system information protocol (PSIP) information which is received from a broadcaster to control an application.

Figure 7:
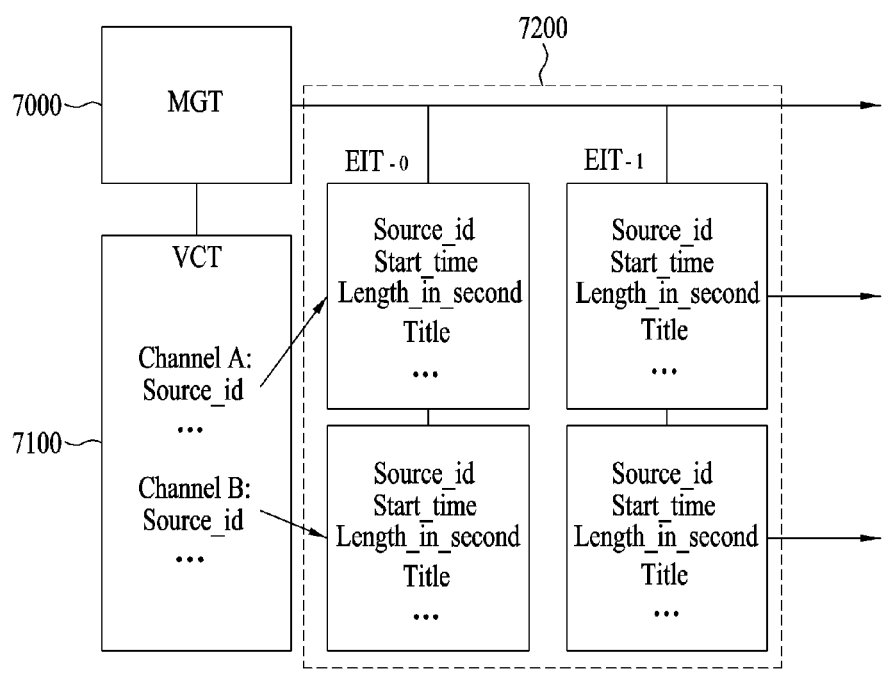
FIG. 7 is a diagram illustrating a correlation between program and system information protocol (PSIP) tables according to an embodiment of the present invention.

FIG. 7 is a diagram illustrating a correlation between PSIP tables according to an embodiment of the present invention.

A DTV receiver according to the present embodiment may extract program information related to a broadcast program of a current channel using information of a PSIP table, and control a life cycle of an application related to the broadcast program using the extracted program information.

FIG. 7 is a diagram illustrating a correlation between PSIP tables transmitted by a broadcaster according to an embodiment of the present invention.

As illustrated in FIG. 7, a master guide table (MGT) 7000 includes information about a PSIP table. Therefore, the DTV receiver according to the present embodiment may receive the MGT and acquire PSIP table information in the MGT. Thereafter, the DTV receiver may acquire a VCT 7100 that includes information about a channel transmitted through a transport stream and an EIT 7200 that includes detailed information about an event according to a time of a particular channel.

The DTV receiver may acquire and infer event information of a current and future broadcast program of a currently viewed broadcast channel from the acquired table information. Specifically, as illustrated in FIG. 7, the DTV receiver may acquire information about a channel number and source_id which indicates a channel supplier corresponding to each channel from the VCT 7100. Then, the DTV receiver may acquire a corresponding EIT using the source_id information. In addition, the DTV receiver may generate an electronic program guide (EPG) using acquired channel information, program information, etc., and provide the EPG to the user.

As described in the foregoing, when entering a particular channel, the DTV receiver may acquire information about a current channel from the VCT, etc., and request that a DNS server transmit application signaling information of the channel using the acquired information. In addition, the DTV receiver may extract start and end times of an event of a particular channel, that is, a particular broadcast program using information included in the EIT, and thus may determine whether the broadcast program is changed with time in the channel. For example, when the user continuously views the same channel, the DTV receiver may terminate execution of an application related to a particular broadcast program at a point in time when the particular broadcast program is terminated.

In addition, when the user arbitrarily terminates an executed application using a remote controller, etc., the DTV receiver according to the present embodiment does not execute the application terminated by the user even if signaling information of the application is acquired while a broadcast program related to the terminated application is ongoing. However, when the program ends, and a new broadcast program is started, the DTV receiver according to the present embodiment may request that the DNS server transmit application signaling information related to the new broadcast program, receive application signaling information related to the new broadcast program, and execute a corresponding application.

Figure 8:
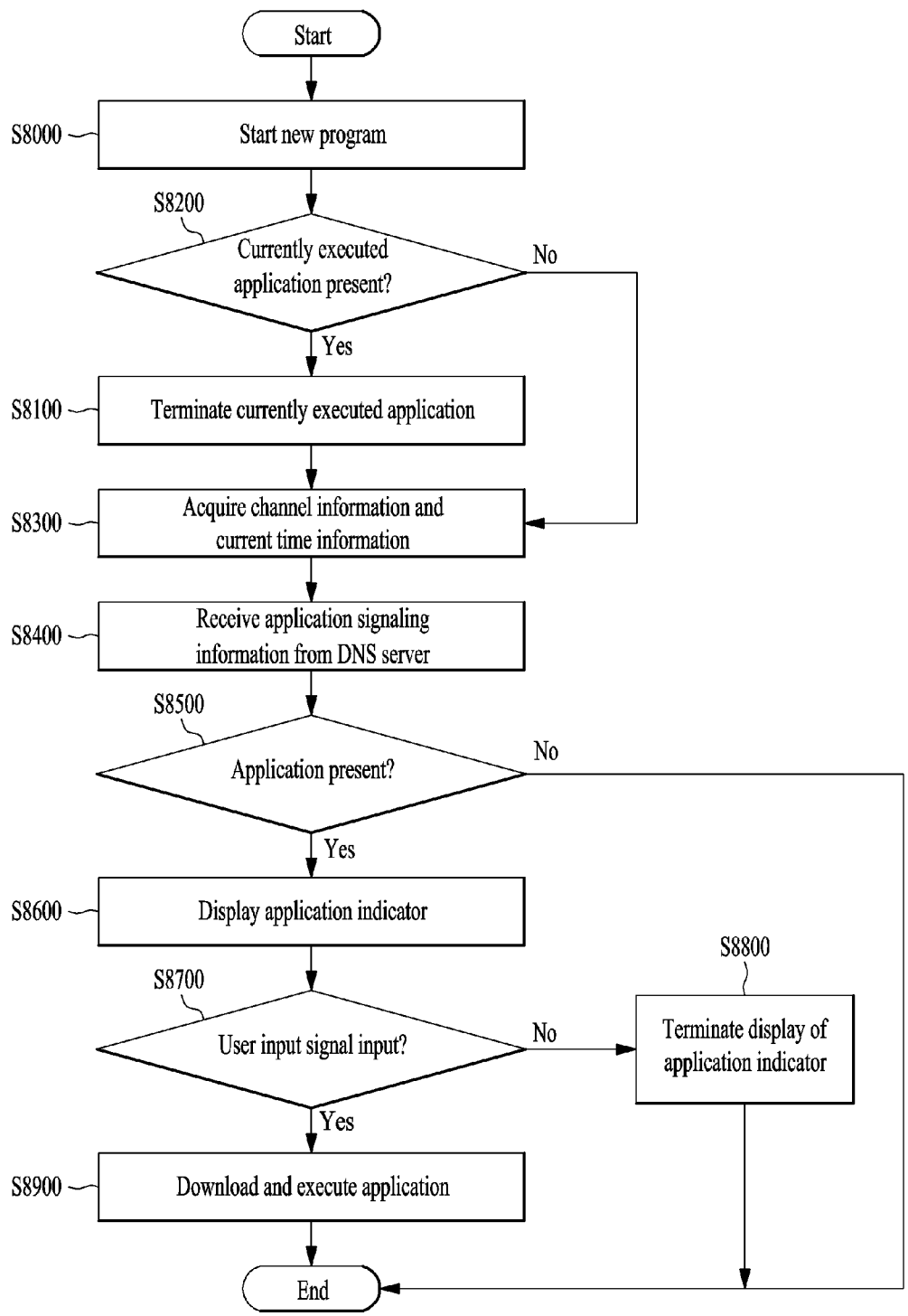
FIG. 8 is a flowchart illustrating another operation of the DTV receiver according to another embodiment of the present invention.

FIG. 8 is a flowchart illustrating another operation of the DTV receiver according to another embodiment of the present invention.

Specifically, FIG. 8 is a flowchart illustrating an operation in which, when a new broadcast program is started on one channel, the DTV receiver according to the present embodiment acquires application signaling information related to the new broadcast program, and executes an application. The operation of the DTV receiver illustrated in FIG. 8 is similar to the operations of the DTV receiver described with reference to FIGS. 4 to 6, and thus will be briefly described.

In S8000, the DTV receiver according to the present embodiment may start a new program.

Thereafter, in S8100, the DTV receiver according to the present embodiment may determine whether a currently executed application is present.

When the currently executed application is present as a result of determination, the DTV receiver according to the present embodiment may suspend execution of the application in S8200.

Thereafter, in S8300, the DTV receiver according to the present embodiment may acquire channel information, current time information, etc. from signaling information which is received from a broadcaster. The signaling information received from the broadcaster may include a service signaling table, such as a VCT, etc.

Thereafter, in S8400, the DTV receiver according to the present embodiment may receive application signaling information from a DNS server.

Then, in S8500, the DTV receiver according to the present embodiment may determine whether an application related to a current broadcast program is present using the application signaling information.

When the application related to the current broadcast program is absent as a result of determination, the DTV receiver according to the present embodiment may terminate the operation for execution of the application.

When the application related to the current broadcast program is present as a result of determination, the DTV receiver according to the present embodiment may display an application indicator for execution of the application on a display unit in S8600.

Thereafter, in S8700, the DTV receiver according to the present embodiment may determine whether a user input signal for execution of the above-described application indicator is input by the user.

When the user input signal is not input as a result of determination, the DTV receiver according to the present embodiment may terminate display of the application indicator in S8800.

When the user input signal is input as a result of determination, the DTV receiver according to the present embodiment may download an application from an application server, and execute the downloaded application in S8900.

Thereafter, the DTV receiver may terminate the operation for execution of the application.

Figure 9:
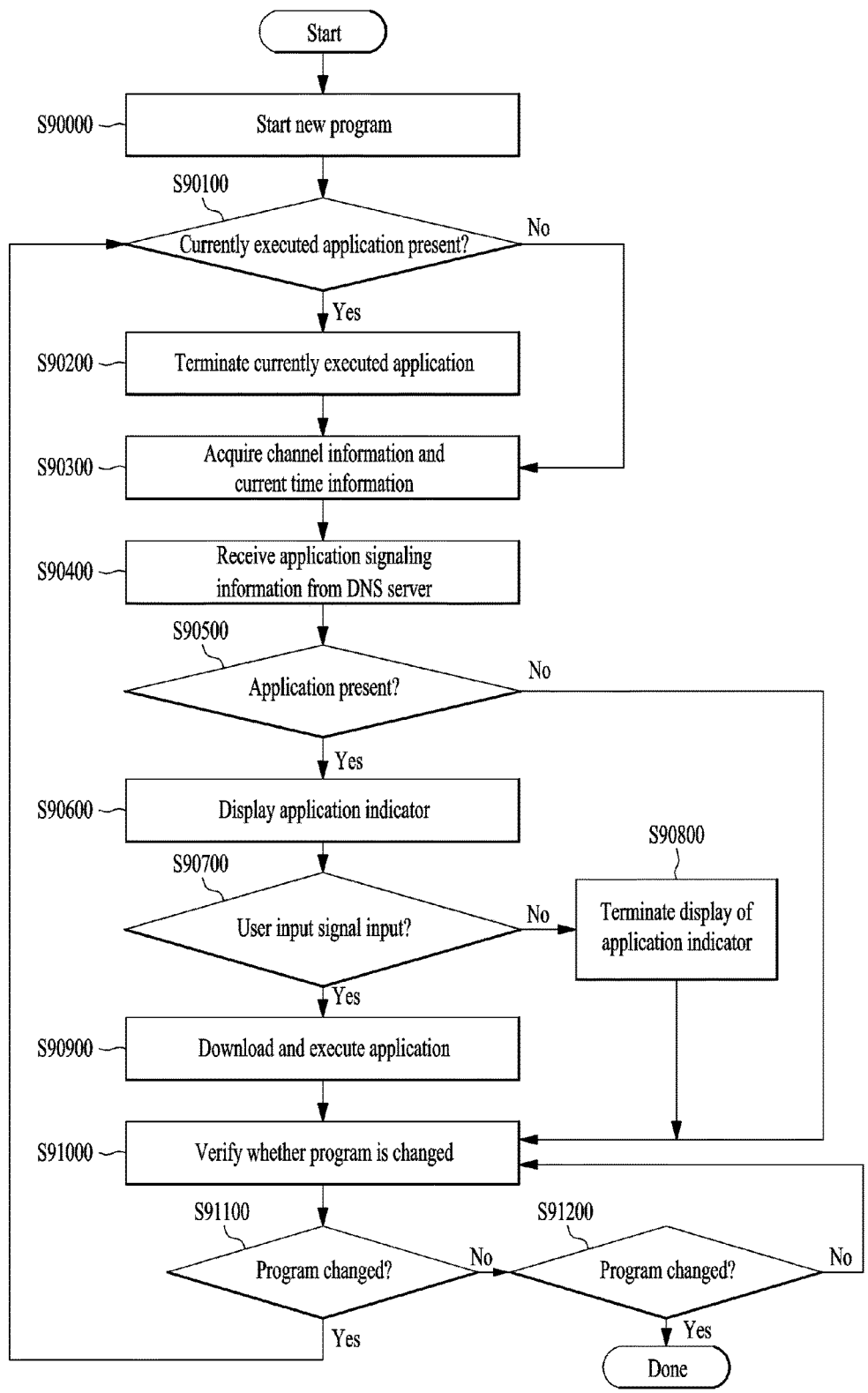
FIG. 9 is a flowchart illustrating another operation of the DTV receiver according to another embodiment of the present invention.

FIG. 9 is a flowchart illustrating another operation of the DTV receiver according to another embodiment of the present invention.

Specifically, FIG. 9 is a flowchart illustrating an operation in which, when a new channel is entered, the DTV receiver according to the present embodiment acquires application signaling information related to the new channel. The operation of the DTV receiver illustrated in FIG. 9 is similar to the operations of the DTV receiver described with reference to FIGS. 4 to 6 and FIG. 8, and thus will be briefly described.

In S90000, the DTV receiver according to the present embodiment may start a new channel.

Thereafter, in S90100, the DTV receiver according to the present embodiment may determine whether a currently executed application is present.

When the currently executed application is present as a result of determination, the DTV receiver according to the present embodiment may suspend execution of the application in S90200.

Thereafter, in S90300, the DTV receiver according to the present embodiment may acquire channel information, current time information, etc. from signaling information received from a broadcaster.

Then, in S90400, the DTV receiver according to the present embodiment may receive application signaling information from a DNS server.

Then, in S90500, the DTV receiver according to the present embodiment may determine whether an application related to a current broadcast program is present using the application signaling information.

When the application related to the current program is absent as a result of determination, the DTV receiver according to the present embodiment may verify whether a program of a current channel is changed using an EIT received from the broadcaster in S91000.

When the application related to the current program is present as a result of determination, the DTV receiver according to the present embodiment may display an application indicator for execution of the application on a display unit in S90600.

Thereafter, in S90700, the DTV receiver according to the present embodiment may determine whether a user input signal for execution of the above-described application indicator is input by the user.

When the user input signal is not input as a result of determination, the DTV receiver according to the present embodiment may terminate display of the application indicator in S90800. Then, in S91000, the DTV receiver according to the present embodiment may verify whether the program of the current channel is changed using the EIT which is received from the broadcaster.

On the other hand, when the user input signal is input as a result of determination, the DTV receiver according to the present embodiment may download an application from an application server, and execute the downloaded application in S90900.

Thereafter, in S91000, the DTV receiver according to the present embodiment may determine whether the broadcast program of the current channel is changed using the EIT which is received from the broadcaster.

When the broadcast program is changed according to a result of determination, the DTV receiver according to the present embodiment may determine whether a currently executed application is present again in S90100. Then, the DTV receiver according to the present embodiment may perform an operation according to respective steps from S90200.

When the broadcast program is not changed according to a result of determination, the DTV receiver according to the present embodiment may determine whether the current channel is changed in S91200.

When the channel is changed as a result of determination, the DTV receiver according to the present embodiment may verify whether the program of the current channel is changed using the EIT which is received from the broadcaster in S91000. Then, the DTV receiver according to the present embodiment may perform an operation according to respective steps from S91100.

When the channel is not changed as a result of determination, the DTV receiver according to the present embodiment may terminate the operation for execution of the application.

Figure 10:
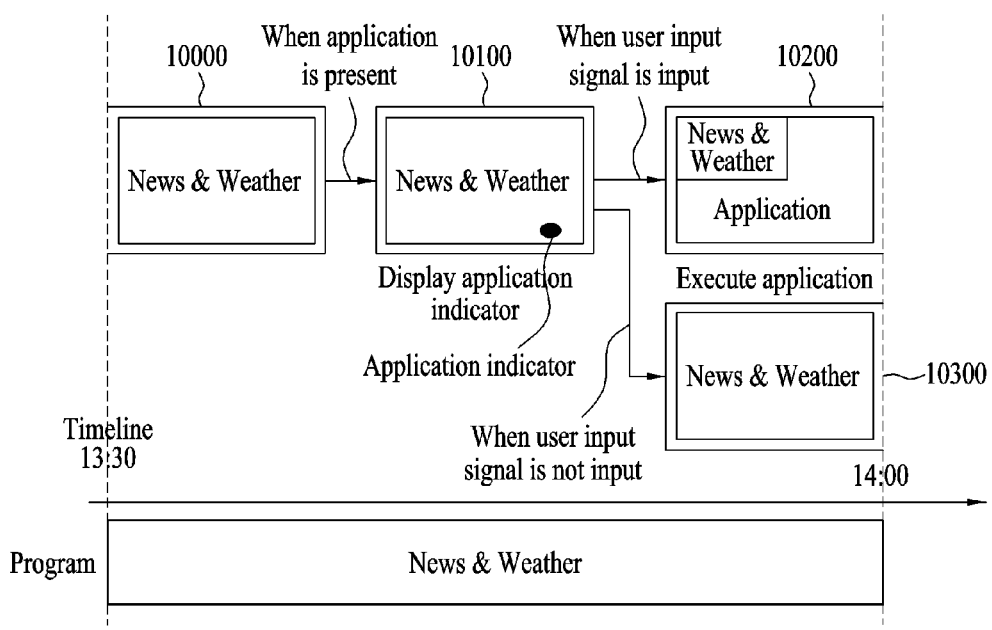
FIG. 10 is a diagram illustrating an operation of the DTV receiver according to an embodiment of the present invention.

FIG. 10 is a diagram illustrating an operation of the DTV receiver according to an embodiment of the present invention.

FIG. 10 is a diagram illustrating an operation of the DTV receiver in response to a user input when an application related to a current program is present. Specifically, FIG. 10 is a diagram illustrating an operation of the DTV receiver according to the present embodiment during a broadcast time of a broadcast program "News & weather".

As described with reference to FIGS. 4 to 6 and FIGS. 8 and 9, the DTV receiver according to the present embodiment may display the broadcast program "News & weather" during the broadcast time (timeline) (10000). Thereafter, as described in the foregoing, the DTV receiver according to the present embodiment may receive application signaling information from a broadcaster or a DNS server, and determine whether an application related to the broadcast program "News & weather" which is currently displayed is present using the application signaling information.

As described in the foregoing, when the application signaling information is received from the DNS server, the DTV receiver according to the present embodiment may create a request using channel information, current time information, etc. acquired from the signaling information received from the broadcaster, transmit a request signal to the DNS server, and receive the application signaling information from the DNS server. Details are similar to the description with reference to FIGS. 4 to 6 and FIGS. 8 and 9, and thus will be omitted.

In addition, the DTV receiver according to the present embodiment may display an application indicator for execution of an application on a display unit (10100). As described in the foregoing, the application indicator according to the present embodiment is used to inform the user that a related application is ready to be executed and may be entered through a red button of a remote controller. In addition, as illustrated in FIG. 10, the application indicator according to the present embodiment may be displayed together with content of a currently displayed broadcast program. In addition, a shape of the application indicator and a position, etc. of the displayed application indicator may be changed by a designer. Further, a user input signal according to the present embodiment may be delivered to the DTV receiver through operation of the red button of the remote controller by the user. Therefore, the DTV receiver according to the present embodiment may determine whether the user input signal for execution of the above-described application indicator is input by the user.

When the user input signal is determined to be input, the DTV receiver according to the present embodiment may download an application from an application server, and execute the downloaded application (10200). In this case, as illustrated in FIG. 10, the DTV receiver according to the present embodiment may terminate display of the application indicator, and display the application and the content of the current broadcast program "News & weather" at the same time on the display unit.

When the user input signal is determined as not having been input, the DTV receiver according to the present embodiment terminates display of the application indicator, and does not execute the application until the current program "News & weather" is terminated (10300).

Figure 11:
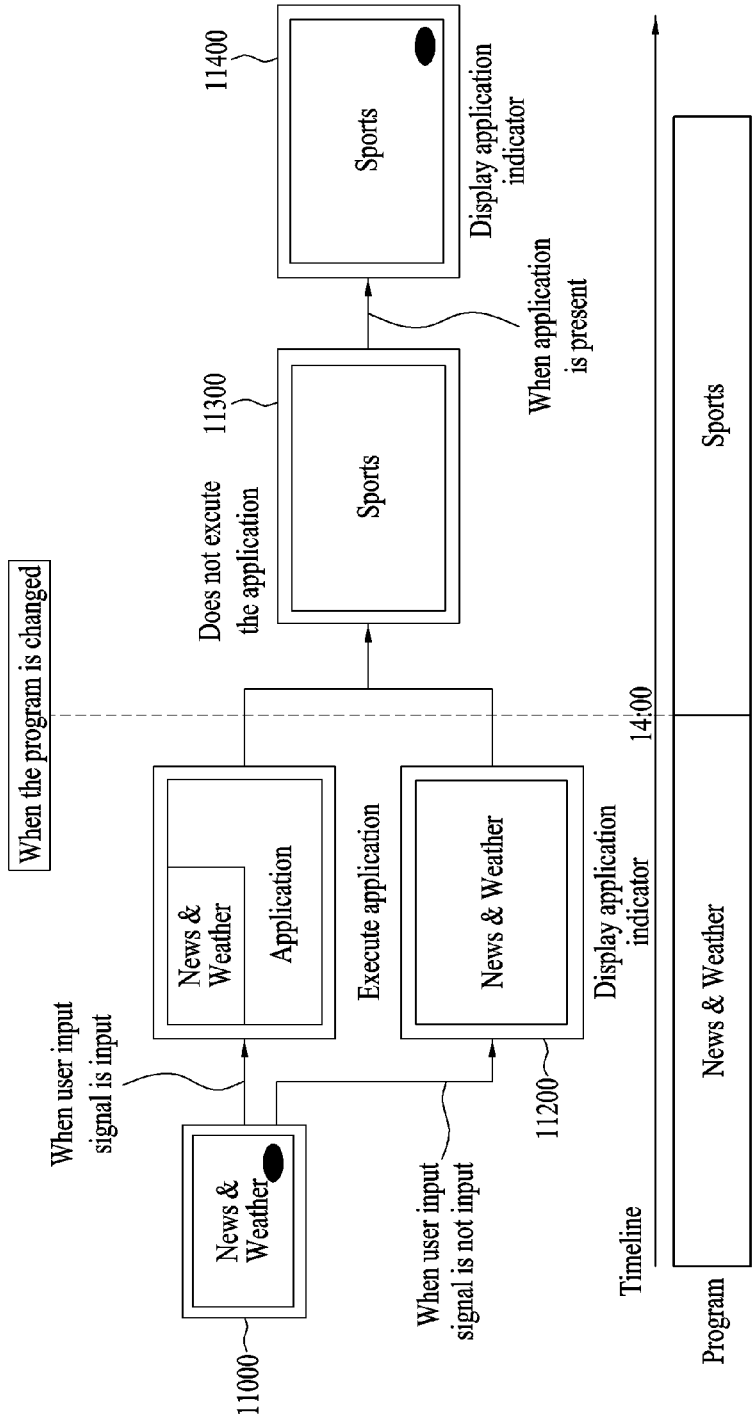
FIG. 11 is a diagram illustrating another operation of the DTV receiver according to another embodiment of the present invention.

FIG. 11 is a diagram illustrating another operation of the DTV receiver according to another embodiment of the present invention.

FIG. 11 is a diagram illustrating an operation of the DTV receiver for controlling a life cycle of an application when a currently broadcast program is changed. Specifically, FIG. 11 is a diagram illustrating an operation of the DTV receiver for terminating execution of the application when a broadcast program is changed from "News & weather" to "Sports". As described with reference to FIG. 10, FIG. 11 presumes a case in which an application related to the current broadcast program "News & weather" is present.

As described with reference to FIGS. 4 to 6 and FIGS. 8 and 9, the DTV receiver according to the present embodiment may display an application indicator for execution of an application during a broadcast time (timeline) of the broadcast program "News & weather" (10000).

Thereafter, as described with reference to FIG. 10, the DTV receiver according to the present embodiment may determine whether a user input signal for execution of the above-described application indicator is input by the user.

When the user input signal is determined to be input, the DTV receiver according to the present embodiment may download an application from an application server, and execute the downloaded application (11200). In this case, as illustrated in FIG. 10, the DTV receiver according to the present embodiment may terminate display of the application indicator, and display the application and the content of the current broadcast program "News & weather" at the same time on the display unit.

When the user input signal is determined as not having been input, the DTV receiver according to the present embodiment terminates display of the application indicator, and does not execute the application until the current program "News & weather" is terminated (11300).

Thereafter, the DTV receiver according to the present embodiment may receive changed application signaling information from a DNS server or detect whether a current program is changed using information in a VIT and an EIT received from a broadcaster.

When the changed application signaling information received from the DNS server or the information in the VIT and the EIT indicates that the current broadcast program "News & weather" is terminated and a broadcast program "sports" is started, the DTV receiver according to the present embodiment may terminate the displayed broadcast program "News & weather" and application, and display the new broadcast program "sports" according to the changed application signaling information received from the DNS server or the information in the VIT and the EIT (11300). Details are similar to the description with reference to FIGS. 3 to 9.

Thereafter, as described in the foregoing, the DTV receiver according to the present embodiment may receive application signaling information from the broadcaster or the DNS server, and determine whether an application related to the currently displayed program "News & weather" is present using the application signaling information. Details are similar to the description with reference to FIGS. 4 to 6 and FIGS. 8 to 10, and thus will be omitted.

Thereafter, the DTV receiver according to the present embodiment may display the application indicator for execution of the application on the display unit (11400).

Figure 12:
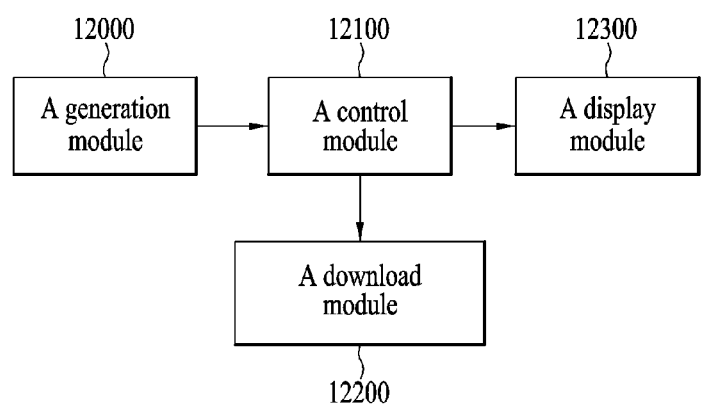
FIG. 12 is a block diagram showing an apparatus for processing a digital service signal according to an embodiment of the present invention.

FIG. 12 is a block diagram showing an apparatus for processing a digital service signal according to an embodiment of the present invention.

The digital service signal processing apparatus according to the present embodiment may include a generation module 12000, a control module 12100, a display module 12200, and a download module 12300. Hereinafter, the respective modules will be described.

The generation module 12000 may generate a request signal for reception of application signaling information. Specifically, the generation module 12000 according to the present embodiment may acquire channel information, time information of a current broadcast program, etc. from signaling information which is received from a broadcaster. The signaling information received from the broadcaster may include a service signaling table, etc. such as a VCT and an EIT, and the generation module 12000 may acquire the channel information, the time information of the current broadcast program, etc. from the service signaling table. Thereafter, the generation module 12000 according to the present embodiment may create an HTTP request using the acquired channel information, time information of the current broadcast program, etc. The HTTP request may be created as a combination of a parent domain name, specific media, a major channel number, a minor channel number, etc. such as "http://www.ohtv.org?ch=9-1&time=2012-11-10-13:10& . . . ". This may be changed by a designer.

Thereafter, the control module 12100 may transmit the request signal for delivery of the created HTTP request to a DNS server. In addition, the control module 12100 according to the present embodiment may receive application signaling information corresponding to the request signal from the DNS server. As described with reference to FIGS. 3 to 9, the application signaling information may include application URL information, etc. Thereafter, the control module 12100 according to the present embodiment may determine whether an application corresponding to the received application signaling information is currently stored using the received application signaling information. Specifically, as described with reference to FIGS. 4 to 6 and FIGS. 8 and 9, the control module 12100 may determine whether an application related to the received application signaling information is identical to an application which is previously stored or currently executed using the received application signaling information, and determine whether the application related to the received application signaling information is valid for a current channel. In addition, upon determining that the application related to the received application signaling information is not identical to the application previously stored or currently executed, and is valid for the current channel, the control module 12100 may suspend the currently executed application.

When the application is not stored as a result of determination, the download module 12300 may download an application using the application URL information in the received application signaling information. Thereafter, the control module 12100 may execute the downloaded application, and the display module 12300 may display content of the broadcast program together with the application.

In addition, the display module 12300 may display an application indicator for execution of the application. As described with reference to FIG. 4, the application indicator is used to inform the user that the related application is ready to be executed and may be entered through a red button of a remote controller. The application indicator according to the present embodiment may be displayed together with content of a currently displayed broadcast program. In addition, a shape of the application indicator and a position, an area, etc. of the displayed application indicator may be changed by a designer. Further, the user may input a user input signal to the control module 12100 using the red button of the remote controller.

In addition, the control module 12100 according to the present embodiment may control a life cycle of the application by receiving information about a changed broadcast program from the DNS server or receiving the information about the changed broadcast program from the broadcaster.

Specifically, as described with reference to FIG. 4, the control module 12100 according to the present embodiment may receive changed application signaling information by periodically transmitting the request signal to the DNS server or receive the changed application signaling information from the DNS server not by transmitting the request signal. The changed application signaling information may include changed broadcast program information or application URL information, etc. according to the changed broadcast program information. Therefore, the control module 12100 according to the present embodiment may verify whether the broadcast program is changed using the application signaling information acquired from the DNS server, and terminate execution of the currently executed application or execute a new application depending on whether the broadcast program is changed, thereby controlling the life cycle of the application.

In addition, the control module 12100 according to the present embodiment may receive the service signaling table from the broadcaster, and control the life cycle of the application using information in the service signaling table. The service signaling table according to the present embodiment includes a PSIP table, and may include an MGT, a VCT, an EIT, etc. as described with reference to FIG. 7. Specifically, the control module 12100 according to the present embodiment may receive the MGT, acquire information about the PSIP table in the MGT, and then acquire the VCT which includes information about a channel transmitted through a transport stream, the EIT which includes detailed information of an event according to a time of a particular channel, etc. When entering the particular channel, the control module 12100 according to the present embodiment may acquire information about a current channel from the VCT, and request that the DNS server transmit application signaling information for the channel using the acquired information. In addition, the control module 12100 according to the present embodiment may extract start and end times of an event of the particular channel, that is, a particular broadcast program using information included in the EIT, and thus may determine whether the broadcast program is changed with time in the channel. For example, when the user continuously views the same channel, the DTV receiver may terminate execution of an application related to a particular broadcast program at a point in time when the particular broadcast program is terminated. Details are similar to the description with reference to FIGS. 7 to 9.

In addition, when the user arbitrarily terminates an executed application using the remote controller, etc., the control module 12100 according to the present embodiment does not execute the application terminated by the user even if signaling information of the application is acquired while a broadcast program related to the terminated application is ongoing. However, when the program ends, and a new broadcast program is started, the control module 12100 according to the present embodiment may request that the DNS server transmit application signaling information related to the new broadcast program, receive application signaling information related to the new broadcast program, and execute a corresponding application.

FIG. 13 is a flowchart illustrating a method of processing a digital service signal according to an embodiment of the present invention.

In S13000, a digital service signal processing apparatus according to the present embodiment may generate a request or a request signal for reception of signaling information of an application. Specifically, the generation module described with reference to FIG. 12 may acquire channel information, time information of a current broadcast program, etc. from signaling information which is received from a broadcaster. The signaling information received from the broadcaster may include a service signaling table, etc. such as a VCT and an EIT, and the generation module 12000 may acquire the channel information, the time information of the current broadcast program, etc. from the service signaling table. Thereafter, the generation module according to the present embodiment may create an HTTP request using the acquired channel information, time information of the current broadcast program, etc. The HTTP request may be created as a combination of a parent domain name, specific media, a major channel number, a minor channel number, etc. such as "http://www.ohtv.org?ch=9-1&time=2012-11-10-13:10& . . . ". This may be changed by a designer.

Thereafter, in S13100, the digital service signal processing apparatus according to the present embodiment may transmit the generated request. Specifically, the control module described with reference to FIG. 12 may transmit the request signal for delivery of the request to a DNS server.

Thereafter, in S13200, the digital service signal processing apparatus according to the present embodiment may receive signaling information of the application. Specifically, the control module described with reference to FIG. 12 may receive application signaling information corresponding to the request signal from the DNS server. As described with reference to FIGS. 3 to 9, the application signaling information may include application URL information, etc.

Thereafter, in S13300, the digital service signal processing apparatus according to the present embodiment may determine whether the application is stored using the received application signaling information.

Specifically, as described with reference to FIG. 12, the control module according to the present embodiment may determine whether the application corresponding to the received application signaling information is currently stored using the received application signaling information. As described with reference to FIGS. 4 to 6 and FIGS. 8 and 9, the control module may determine whether the application related to the received application signaling information is identical to an application which is previously stored or currently executed using the received application signaling information, and determine whether the application related to the received application signaling information is valid for a current channel. In addition, upon determining that the application related to the received application signaling information is not identical to the application which is previously stored or currently executed, and is valid for the current channel, the control module may suspend execution of the currently executed application.

Thereafter, when the application is not stored as a result of determination, the digital service signal processing apparatus according to the present embodiment may download an application using the signaling information of the received application in S13400. Specifically, as described with reference to FIG. 12, the download module may download the application using the application URL information in the received application signaling information.

Thereafter, in S13500, the digital service signal processing apparatus according to the present embodiment may execute the downloaded application.

Specifically, as described with reference to FIG. 12, the control module may execute the downloaded application, and the display module may display content of the broadcast program together with the application. In addition, the display module may display an application indicator for execution of the application. As described with reference to FIG. 4, the application indicator is used to inform the user that the related application is ready to be executed and may be entered through a red button of a remote controller. The application indicator according to the present embodiment may be displayed together with content of a currently displayed broadcast program. In addition, a shape of the application indicator and a position, an area, etc. of the displayed application indicator may be changed by a designer. Further, the user may input a user input signal to the control module using the red button of the remote controller.

In addition, the digital service signal processing apparatus according to the present embodiment may control a life cycle of the application by receiving information about a changed broadcast program from the DNS server or receiving the information about the changed broadcast program from the broadcaster.

Specifically, as described with reference to FIG. 12, the control module according to the present embodiment may receive changed application signaling information by periodically transmitting the request signal to the DNS server or receive the changed application signaling information from the DNS server not by transmitting the request signal as described with reference to FIG. 4. The changed application signaling information may include changed broadcast program information or application URL information, etc. according to the changed broadcast program information. Therefore, the control module according to the present embodiment may verify whether the broadcast program is changed using the application signaling information acquired from the DNS server, and terminate execution of the currently executed application or execute a new application depending on whether the broadcast program is changed, thereby controlling the life cycle of the application.

In addition, the control module according to the present embodiment may receive the service signaling table from the broadcaster, and control the life cycle of the application using information in the service signaling table. The service signaling table according to the present embodiment includes a PSIP table, and may include an MGT, a VCT, an EIT, etc. as described with reference to FIG. 7. Specifically, the control module according to the present embodiment may receive the MGT, acquire information about the PSIP table in the MGT, and then acquire the VCT which includes information about a channel transmitted through a transport stream, the EIT which includes detailed information of an event according to a time of a particular channel, etc. When entering the particular channel, the control module according to the present embodiment may acquire information about a current channel from the VCT, and request that the DNS server transmit application signaling information for the channel using the acquired information. In addition, the control module according to the present embodiment may extract start and end times of an event of the particular channel, that is, a particular broadcast program using information included in the EIT, and thus may determine whether the broadcast program is changed with time in the channel. For example, when the user continuously views the same channel, the DTV receiver may terminate execution of an application related to a particular broadcast program at a point in time when the particular broadcast program is terminated. Details are similar to the description with reference to FIGS. 7 to 9.

In addition, when the user arbitrarily terminates an executed application using the remote controller, etc., the control module according to the present embodiment does not execute the application terminated by the user even if signaling information of the application is acquired while a broadcast program related to the terminated application is ongoing. However, when the program ends, and a new broadcast program is started, the control module according to the present embodiment may request that the DNS server transmit application signaling information related to the new broadcast program, receive application signaling information related to the new broadcast program, and execute a corresponding application.

MODE FOR INVENTION

As described above, related matters have been described in the best mode for carrying out the invention.

INDUSTRIAL APPLICABILITY

As described above, the present invention is fully or partially applicable to digital broadcast systems.

The invention claimed is:

1. A method of processing a digital service comprising:
receiving channel information of the digital service and current time information from a broadcaster;
creating a request for reception of URL (Uniform Resource Locator) information of an application related to a program of the digital service using the channel information and the current time information;
transmitting the request to a DNS (Domain Name System) server,
wherein the DNS server has a data base including program information according to each channel, the program information includes titles of programs of each channel, start time of the programs, end time of the programs and URL information of applications related to the programs;
receiving the URL information of the application from the DNS server in response to the request;
downloading the application using the URL information of the application from an application server;
executing the application;
receiving another URL information of another application related to another program from the DNS server when the DNS server detects that the program is changed to the another program using the program information and the current time information;
downloading the another application using the another URL information from the application server; and
terminating the application and executing the another application.

2. The method according to claim 1, wherein the method further includes:
receiving program metadata of the digital service from a broadcaster, the program metadata includes start time of programs of the digital service and end time of programs of the digital service;
checking whether the program is changed to the another program using the program metadata; and
creating another request for reception of the another URL information of another application related to the another program from the DNS server.

3. The method according to claim 1, further comprising displaying an application indicator for execution of the downloaded application.

4. The method according to claim 3, further comprising:
receiving an input of a user input signal for selection of the application indicator; and
executing the downloaded application in response to the input of the user input signal.

5. The method according to claim 4, wherein the user input signal for selection of the application indicator is input through a red button of a remote controller.

6. The method according to claim 4, further comprising terminating execution of the application when a channel of a digital service signal is changed.

7. The method according to claim 4, further comprising:
receiving an input of a user input signal for termination of execution of the application; and
suspending execution of the application in response to the input of the user input signal.

8. An apparatus for processing a digital service comprising:
a receiving module to receive channel information of the digital service and current time information from a broadcaster;
a generation module to create a request for reception of URL (Uniform Resource Locator) information of an application related to a program of the digital service signal using the channel information and the current time information;
a control module to transmit the request to a DNS (Domain Name System) server, receiving the URL information of the application from the DNS server in response to the request,
wherein the DNS server has a data base including program information according to each channel, the program information includes titles of programs of each channel, start time of the programs, end time of the programs and URL information of applications related to the programs; and
a download module to download the application using the URL information of the application from an application server,
wherein the download module executes the application,
wherein the control module further receives another URL information of another application related to another program from the DNS server when the DNS server detects that the program is changed to the another program using the program information and the current time information, wherein the download module further downloads the another application using the another URL information form the application server, wherein the control module terminates the application, and wherein the download module executes the another application.

9. The apparatus according to claim 8, wherein the receiving module further receives program metadata of the digital service from a broadcaster, the program metadata includes start time of programs of the digital service and end time of programs of the digital service, wherein the control module cheeks whether the program is changed to the another program using the program metadata, wherein the generating module further creates another request for reception of the another URL information of another application related to the another program from the DNS server.

10. The apparatus according to claim 8, further comprising a display module to display an application indicator for execution of the downloaded application.

11. The apparatus according to claim 10, wherein the control module receives an input of a user input signal for selection of the application indicator, and executes the downloaded application in response to the input of the user input signal.

12. The apparatus according to claim 11, wherein the user input signal for selection of the application indicator is input through a red button of a remote controller.

13. The apparatus according to claim 11, wherein the control module terminates execution of the application when a channel of a digital service signal is changed.

14. The apparatus according to claim 11, wherein the control module receives an input of a user input signal for termination of execution of the application, and suspends execution of the application in response to the input of the user input signal.

* * * * *